United States Patent Office 3,390,205
Patented June 25, 1968

3,390,205
MONO CARBOXYLIC ACIDS AS THICKENING AIDS FOR MAGNESIUM OXIDE CONTAINING UNSATURATED POLYESTERS
Hermann Schnell, Krefeld-Urdingen, Karl Raichle and Klaus Prater, Krefeld-Bockum, and Friedrich Brühne, Krefeld, Germany, assignors to Farbenfabriken Bayer Aktiengesellschaft, Leverkusen, Germany, a corporation of Germany
No Drawing. Filed Nov. 19, 1965, Ser. No. 508,838
Claims priority, application Germany, Dec. 24, 1964, F 44,809
6 Claims. (Cl. 260—865)

ABSTRACT OF THE DISCLOSURE

The thickening of unsaturated polyesters by magnesium oxide can be enhanced by adding active amounts of a component selected from the group consisting of an aliphatic monocarboxylic acid having a carbon chain of 2–5 carbon atoms, the corresponding anhydrides thereof, a semi-ester of a cyclic anhydride forming linear aliphatic dicarboxylic acid and an acid ester of phosphoric acid.

In producing and utilizing molding masses of unsaturated polyesters with copolymerizable unsaturated monomeric compounds, it is known to employ reinforcing fillers such as glass fibers and/or powdery fillers. Magnesium oxide has also been used in such molding compositions or masses. Masses of this type are customarily hardened by heating under pressure.

According to the accepted method of working, finely-divided magnesium oxide and sometimes powdery fillers are incorporated into the polyester moulding masses together with polymerization catalysts; the resulting mixture possesses an initially low viscosity and thickens after some time through the action of the magnesium oxide, and eventually becomes tack-free. This thickening can be observed by measuring the viscosity.

To produce tack-free synthetic resin-bonded fibrous objects, which are hardenable by heating under pressure and with moulding, however, the above mixtures must have a low viscosity to effect impregnation of the reinforcing fillers and thereafter stored until the surface of the products has become tack-free.

The polyester moulding masses and the process whereby they are obtained possess disadvantages which render them unsuitable for practical production. In particular, the moulding mass thickens very slowly so that it becomes tack-free and ready for working only after several weeks. An undesirably prolonged and disadvantageous storage is, therefore, necessary if such moulding masses are to be continuously produced and worked up. Polyester moulding masses of the above type are also limited to the extent that the thickening, in the case of identically constituted polyesters obtained in different production, cannot be reproduced with certainty, i.e., strongly varying thickening times are required so that there is a risk, inter alia, that individual batches mature too much and can no longer be worked up satisfactorily.

It has now been found that the above disadvantages can be avoided and polyester moulding masses which, under the influence of magnesium oxide, thicken quickly and reproducibly to give tack-free products, are obtained when, polyester moulding masses are used containing 0.002–0.10 gram equivalents of specified acids dissolved per 100 g. of moulding mass.

For this purpose aliphatic, possibly substituted carboxylic acids with a chain length of 2–5 carbon atoms, and/or semi-esters of cyclic anhydride-forming linear aliphatic dicarboxylic acids, and/or sulphonic acids, and/or partial phosphoric acid esters, the magnesium salts of which in polyester moulding masses have a solubility of at least 0.0005 gram equivalents per 100 g. at 25° C., are found suitable. Instead of the above free acids, their anhydrides or halides can also be used.

As examples for suitable acids, there may be mentioned: acetic acid, mono-chloroacetic acid, dichloroacetic acid, trichloroacetic acid, phenyl acetic acid, methoxy-acetic acid, ethoxyacetic acid, phenoxy acetic acid, propionic acid, butyric acid, isobutyric acid, valeric acid, iso-valeric acid, lactic acid, acrylic acid, methacrylic acid, crotonic acid, laevulinic acid, succinic acid monoethyl ester, maleic acid and fumaric acid monoethyl ester, -monopropyl ester, -monobutyl ester and -monoamyl ester, phosphoric acid monoethyl ester, phosphoric acid diethyl ester, phosphoric acid monopropyl ester, phosphoric acid dipropyl ester, phosphoric acid monobutyl ester, phosphoric acid dibutylester, phosphoric acid monoamyl ester and phosphoric acid diamyl ester, acetyl chloride, acetic acid anhydride and p-toluene-sulphonic acid.

The addition of the acids surprisingly effects a considerable shortening of the period of time from the addition of the magnesium oxide to the achievement of the tack-free state which will allow a working up of the polyester moulding masses.

While it is known to incorporate magnesium salts of carboxylic acids into polyester moulding masses, such salts, do not possess an accelerating action on the thickening of the polyester moulding masses with magnesium oxide. It is also known to react polyester moulding masses with straight chain or branched aliphatic mono-carboxylic acids containing at least 6 carbon atoms in the chain and an oxide, hydroxide or alcoholate of calcium, magnesium or aluminium, at 60–120° C. in the presence of a water-binding agent, whereby an increase of the viscosity takes place.

Again, however, these acids have no influence of shortening the thickening time of magnesium oxide-containing polyester moulding masses. In some cases, these acids even increase the thickening time. Consequently, it was not to be foreseen that it would be possible, in the case of the masses according to the invention, considerably to accelerate the thickening of polyester moulding masses brought about by magnesium oxide.

Unsaturated polyesters in the meaning of the invention are the customary products obtained by the polycondensation of $\alpha,\beta$-unsaturated dicarboxylic acids, such as maleic acid, monochloromaleic acid, fumaric acid, mesaconic acid, itaconic acid, citraconic acid, dimeric methacrylic acid and the like, or their esters or anhydrides, or mixtures thereof with possibly unsaturated polybasic alcohols, such as ethylene glycol, propane-1,2-diol, butane-1,3-diol, butane-1,4-diol, but-2-ene-1,4-diol, hexane-1,6-diol, etc., diethylene glycol, polyalkylene glycol ethers, bis-$\beta$-hydroxyalkyl ethers of aromatic dihydroxy compounds, such as 2,2-bis-(4-$\beta$-hydroxy-alkoxy-phenyl)-alkanes or cycloalkanes, xylylene - glycols, 1,3 - dimethylol - cyclobutane, quinitol, 2,2-bis-(hydroxy-cyclohexyl)-alkanes and cycloalkanes, etc., possibly with the addition of other dicarboxylic acids, such as o-phthalic acid, isophthalic acid, terephthalic acid, tetrahydrophthalic acid, hexohydrophthalic acid, tetrachlorophthalic acid, endomethylene-tetrahydrophthalic acid, hexachloro-endomethylene-tetrahydrophthalic acid, succinic acid, glutaric acid, adipic acid, pimelic acid, etc., or of other mono- or poly-basic alcohols, or carboxylic acids, such as acrylic acid, methacrylic acid, coconut fatty acid, stearic acid, palmitic acid, lauric acid, trimellitic acid, glycerol, trimethylolethane, trimethylol-propane, pentaerythritol, allyl alcohol, and partial ethers of monobasic and polybasic aliphatic alcohols, etc., with a content of radicals of $\alpha,\beta$- unsaturated aliphatic dicarboxylic acids of at least about 10 mol. percent, referred to the total content of carboxylic acid radicals.

Suitable copolymerizable monomeric unsaturated compounds are the vinyl and allyl compounds customarily used for the production of polyester moulding masses, e.g., styrene, monochloro styrene, dichloro styrene, p-vinyl toluene, vinyl naphthalene, divinyl benzol, acrylic acid and meth-acrylic acid methyl and ethyl ester, triallyl phosphate, triallyl cyanurate, diallyl phthalate, diallyl succinate, diallyl maleinate, diallyl fumarate, vinyl acetate, vinyl propionate, vinyl stearate and acrylonitrile.

The content of unsaturated polyesters in the polyester moulding masses according to the invention can vary within wide limits. In general, it amounts to about 20–90 percent by weight, preferably about 25—about 80 percent by weight, referred to the polyester moulding masses.

The unsaturated polyesters may also contain conventional inhibitors, for example, hydroquinone, tert.-butyl-catechol, benzoquinone, di-tert.-butyl-benzoquinone and the like, in the usual amounts, in general, about 0.001 to about 0.1%.

As catalysts there are expediently used compounds which are stable at room temperature but which, upon heating, yield polymerization-initiating radicals, such as e.g., benzoyl peroxide, dicumol peroxide, cumol hydroperoxide, tert.-butyl-hydroperoxide, di-tert.-butyl peroxide, tert.-butyl perbenzoate, azo-diisobutyric acid dinitrile and pinacones forming effective radicals, such as benzpinacone, in amounts of about 0.5 to 5 percent by weight, referred to the polyester moulding masses.

For the production of polyester moulding masses according to the invention, there are dissolved in the polyester moulding masses, which expediently possess an acid number of 10–75, 0.002 to 0.100 gram equivalents, referred to 100 g., of the mentioned acids, and into the acid-containing mixtures there are incorporated 0.5 to 10 percent by weight of magnesium oxide and simultaneously or a short time later, 0.5 to 5 percent by weight of polymerization catalysts. The amount of magnesium oxide should expediently be such that there are at least 0.75 mol magnesium oxide per gram equivalent of the total free acid groups in order to achieve a complete thickening. The acids may also be added to the unsaturated polyesters before dissolving in suitable copolymerizable monomers. It is also immaterial if the polymerization catalysts are added the acids. The magnesium oxide may also be added to the mixtures in two steps. Thus for example, it is possible, without disadvantage, first to use only the amount of magnesium oxide equivalent to the added acid, whereby the viscosity does not change appreciably, and then to complete the thickening with the remainder of the magnesium oxide until a tack-free state is achieved. This is all the more surprising since, after the addition of magnesium salts of carboxylic acids to polyester moulding masses, their thickening is not accelerated with magnesium oxide.

The resultant mixtures the viscosity of which is still low can subsequently be used for the impregnation of the fillers, such as chalk, kaolin, gieselguhr, talc, quartz powder and the like, or fibres and fabrics, especially glass fibres and glass fibre rovings, mats and fabrics, in the usual amounts. The polyester moulding masses obtained in this way become tack-free even after a short time and can thereafter be worked up in the usual manner by heating under pressure and by moulding into moulded articles of all kinds.

The following examples are given for the purpose of illustrating the invention, in which the stated amounts are parts by weight and percentages by weight.

EXAMPLE 1

0.10 gram equivalents of the acids set out in Table 1 are dissolved in amounts of 1 kg. of a solution of 70 parts of an unsaturated polyester, produced by the polycondensation of 50 mol phthalic anhydride, 50 mol maleic anhydride, 50 mol diethylene glycol and 53 mol ethylene glycol, in 30 parts of styrene. The acid-free resin mass possesses an acid number of 22 and a viscosity of 2000 cps. at 20° C.

The thickening times with magnesium oxide of these samples and of the sample without acid are determined. For this purpose, they are finely ground in a roller device with 2.5% of "magnesium oxide light, pure" and stored at 20° C. By the term "thickening time" there is to be understood the time after which the mass has reached a viscosity of 30 million cps. At this value the products are generally tack-free. The result of these measurements, which are carried out with a rotation viscosimeter, is given in the following table. It contains, besides the thickening times, the solubility values of the corresponding magnesium salts in the resin mass.

TABLE 1

| | Acid | Thickening time (days) | Solubility of the Mg salt in the resin mass (25° C.) (value/100 g.) |
|---|---|---|---|
| | Without acid | 6 | |
| Effective acids | Chloroacetic acid | 2 | 0.016 |
| | Crotonic acid | 2 | 0.012 |
| | Phosphoric acid mono- and dibutyl ester (1:1) | 2.5 | 0.008 |
| | Phenyl-acetic acid | 3.5 | 0.010 |
| | Isobutyric acid | 4 | 0.012 |
| | 2-ethyl-caproic acid | 13 | 0.012 |
| Non-effective acids | Formic acid | (¹) | <0.0001 |
| | Glycollic acid | (¹) | <0.0001 |
| | Maleic acid | (¹) | <0.0001 |

¹ Do not thicken.

EXAMPLE 2

In amounts of 1 kg. of a solution of 65 parts of an unsaturated polyester, produced by the polycondensation of 80 mol maleic anhydride, 20 mol phthalic anhydride, 60 mol butylene-1,3-glycol and 43 mol ethylene glycol, in 35 parts of styrene are dissolved 0.10 gram equivalent of the acids set out in the following table. The acid-free resin mass possesses an acid number of 15 and a viscosity of 1500 cps. at 20° C.

The thickening times with 2.0% of magnesium oxide of these samples and of the sample without acid are determined in the same manner as in Example 1. Table 2 gives the results of these measurements and the solubility values of the corresponding magnesium salts in the resin mass.

TABLE 2

| | Acid | Thickening time (days) | Solubility of the Mg salt in the resin mass (25° C.) (value/100 g.) |
|---|---|---|---|
| | Without acid | 5 | |
| Effective acids | Phosphoric acid mono- and dibutyl ester (1:1) | 1 | 0.007 |
| | Acetic acid | 2 | 0.017 |
| | Laevulinic acid | 2 | 0.016 |
| | Maleic acid mono-ethyl ester | 3 | 0.014 |
| Non-effective acids | Lauric acid | (¹) | 0.006 |
| | Cyanoacetic acid | (²) | <0.0001 |
| | Formic acid | (²) | <0.0001 |

¹ After 14 days 18 mill. cps.
² Do not thicken.

EXAMPLE 3

2000 g. of a mixture of 70 parts of an unsaturated polyester, produced from 12.5 mol maleic anhydride, 11.5 mol phthalic anhydride, 12.0 mol diethylene glycol and 12.6 mol propylene-1,2-glycol, and 30 parts of styrene, with an acid number of 33 and a viscosity of 2800 cps. at 20° C., are divided into 8 equal samples. Sample 1 is not further treated, in Sample 2 there are dissolved 0.90% of acetic acid, in Sample 3 3.42% of naphthenic acid (equivalent weight 228) and in Sample 4 3.42% of mono-α-ethyl-hexyl maleate. In Sample 5 0.90% of acetic acid are dissolved, and the solution is subsequently stirred with 0.30% of finely divided magnesium oxide, whereby an almost clear solution with a viscosity of 6400 cps. at 20° C. results after 24 hours. Into Sample 6 1.06% of finely-divided, anhydrous magnesium acetate are incorporated with the use of a roller device. In Sample 7 there are dissolved 3.58% magnesium naphthenate (in the form of a 70% solution in toluene) and in Sample 8 3.58% of the magnesium salt of mono-α-ethyl-hexyl maleate. Samples 1–4 are ground up in a roller device with 3% of magnesium oxide and Samples 5–8 with 2.7% of magnesium oxide, so that the total magnesium content in each sample is the same.

The determination of the thickening time of the magnesium oxide-containing samples was carried out according to the "glass rod method." According to this procedure, 200 g. of the individual samples are weighed in 250 ml.-powder blender and stored at 20° C. The polyester moulding masses are thickened and possess a tack-free surface when a glass rod of 6 mm. diameter is dipped in down to the bottom of the flask and can be withdrawn while rotating without adherent resin residues. Table 3 gives the result of the series of experiments:

TABLE 3

| Sample | Thickening time, days |
|---|---|
| 1 | 4 |
| 2 | 1 |
| 3 | 4 |
| 4 | 3 |
| 5 | 1 |
| 6 | 4 |
| 7 | (¹) |
| 8 | (¹) |

¹ After 14 days still not tack-free.

These experiments show that the thickening time of polyester moulding masses according to the invention is considerably shortened after the addition of magnesium oxide. If these products also contain hardening catalysts, fibres or fabrics and possibly other fillers, then, a surface tackiness no longer being present, they can be moulded at an elevated temperature, within a few minutes, to give valuable moulded products.

What we claim is:

1. A process for producing moulding masses hardenable by heating under pressure in moulds to produce shaped articles, said process comprising admixing at room temperature
   (1) a solution of an unsaturated polyester prepared from unsaturated dicarboxylic acids and polyols and an unsaturated monomer copolymerizable therewith;
   (2) a polymerization catalyst component;
   (3) an active amount of an additional component selected from the group consisting of an aliphatic monocarboxylic acid having a carbon chain of 2–5 carbon atoms, the corresponding anhydrides thereof, a semi-ester of a cyclic anhydride-forming linear aliphatic dicarboxylic acid and an acid ester of phosphoric acid; and
   (4) at least about .75 mol of magnesium oxide for each gram equivalent of total free acid group present; the additional component being further characterized in that magnesium salts thereof have a solubility of at least .0005 gram equivalents at 25° C. in 100 grams of the mixture; and storing the mixture at room temperature until the mixture is tack-free.

2. The process of claim 1 wherein the aliphatic monocarboxylic acid of component (3) is acetic acid.

3. The process of claim 1 wherein the aliphatic monocarboxylic acid of component (3) is crotonic acid.

4. A moulding mass hardenable by heating under pressure to produce shaped article, said mass comprising
   (1) a solution of an unsaturated polyester obtained from unsaturated dicarboxylic acids, polyols and unsaturated monomers copolymerizable therewith;
   (2) a polymerization catalyst;
   (3) an active amount of acetic or crotonic acid;
   (4) at least about .75 mol of magnesium oxide for each gram equivalent of total free acid groups present.

5. Polyester moulding masses according to claim 4, wherein the aliphatic carboxylic acid is acetic acid.

6. Polyester moulding masses according to claim 4, wherein the aliphatic carboxylic acid is crotonic acid.

References Cited

UNITED STATES PATENTS

| 2,529,214 | 11/1950 | Harris | 260—865 |
| 2,628,209 | 2/1953 | Fisk | 260—863 |
| 3,119,791 | 1/1964 | Messina et al. | 260—863 |
| 3,219,604 | 11/1965 | Fischer | 260—22 |
| 3,239,581 | 3/1966 | Raichle et al. | 260—865 |
| 3,260,688 | 7/1966 | Watanabe et al. | 260—863 |
| 3,288,735 | 11/1966 | Watanabe et al. | 260—863 |

FOREIGN PATENTS 1,060,590   7/1959   Germany.

MURRAY TILLMAN, *Primary Examiner.*

SAMUEL H. BLECK, *Examiner.*

J. T. GOOLKASIAN, *Assistant Examiner.*